US012058038B2

(12) United States Patent
Clad et al.

(10) Patent No.: US 12,058,038 B2
(45) Date of Patent: *Aug. 6, 2024

(54) SYSTEMS AND METHODS FOR STEERING TRAFFIC INTO SR-TE POLICIES (71) Applicant: Cisco Technology, Inc., San Jose, CA (US)

(72) Inventors: Francois Clad, Strasbourg (FR); David Delano Ward, Somerset, WI (US); Clarence Filsfils, Brussels (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,560

(22) Filed: Jun. 2, 2022

(65) Prior Publication Data
US 2022/0294729 A1  Sep. 15, 2022

Related U.S. Application Data (63) Continuation of application No. 16/717,717, filed on Dec. 17, 2019, now Pat. No. 11,356,361.
(Continued)

(51) Int. Cl.
*H04L 12/707* (2013.01)
*G06F 1/00* (2006.01)
(Continued)

(52) U.S. Cl.
CPC .............. *H04L 45/34* (2013.01); *H04L 45/22* (2013.01); *H04L 45/3065* (2013.01); *H04L 45/38* (2013.01); *H04L 63/20* (2013.01)

(58) Field of Classification Search
CPC ... H04L 45/306; H04L 45/22; H04L 12/4633; H04L 63/08; H04L 45/3065; H04L 45/34;
(Continued)

(56) References Cited

U.S. PATENT DOCUMENTS 7,751,405 B1   7/2010 Kompella
7,920,558 B2   4/2011 He
(Continued)

FOREIGN PATENT DOCUMENTS

CN   101834793 A   9/2010
CN   107204941 A   9/2017
(Continued)

OTHER PUBLICATIONS

Ray Mota: "Segment Routing, ACG Research Paper", 2018 ACG Research (Year: 2018).*
(Continued)

*Primary Examiner* — Edan Orgad
*Assistant Examiner* — Vanneilian Lalchinthang
(74) *Attorney, Agent, or Firm* — Baker Botts L.L.P.

(57) ABSTRACT

In one embodiment, a method includes a method includes receiving, by a headend node, network traffic. The method also includes determining, by the headend node, that the network traffic matches a service route. The method further includes steering, by the headend node, the network traffic into an SR-TE policy. The SR-TE policy is associated with the service route and includes a security level constraint.

20 Claims, 5 Drawing Sheets

Related U.S. Application Data (60) Provisional application No. 62/829,560, filed on Apr. 4, 2019, provisional application No. 62/829,575, filed on Apr. 4, 2019, provisional application No. 62/829,592, filed on Apr. 4, 2019.

(51) Int. Cl.
*H04L 9/40* (2022.01)
*H04L 29/06* (2006.01)
*H04L 45/00* (2022.01)
*H04L 45/302* (2022.01)

(58) Field of Classification Search
CPC ..... H04L 45/12; H04L 63/0428; H04L 63/20; H04L 45/38; H04L 47/22; H04L 12/4641
USPC .......................................................... 370/401
See application file for complete search history.

(56) References Cited

U.S. PATENT DOCUMENTS

| | | | |
|---|---|---|---|
| 8,155,000 | B2 | 4/2012 | Vasseur |
| 9,161,227 | B1 | 10/2015 | Bye et al. |
| 9,455,992 | B2 | 9/2016 | Douceur et al. |
| 9,654,503 | B1 | 5/2017 | Kowalyshyn |
| 9,762,583 | B2 | 9/2017 | Guccione et al. |
| 10,015,132 | B1 | 7/2018 | Qin et al. |
| 10,211,977 | B1 | 2/2019 | Roth et al. |
| 10,298,488 | B1 | 5/2019 | Wood et al. |
| 10,594,592 | B1 | 3/2020 | Wang |
| 10,652,266 | B1* | 5/2020 | Tautschnig ............... H04L 63/20 |
| 10,735,197 | B2 | 8/2020 | Sundaresan et al. |
| 10,769,635 | B2 | 9/2020 | Lindemann |
| 2002/0012359 | A1 | 1/2002 | Kikuchi et al. |
| 2003/0120948 | A1 | 6/2003 | Schmidt et al. |
| 2005/0047412 | A1 | 3/2005 | Hares |
| 2005/0213768 | A1 | 9/2005 | Durham et al. |
| 2007/0008882 | A1 | 1/2007 | Oran |
| 2007/0028098 | A1 | 2/2007 | Baartman et al. |
| 2007/0076599 | A1 | 4/2007 | Ayyagari et al. |
| 2007/0133406 | A1 | 6/2007 | Vasseur |
| 2007/0180495 | A1 | 8/2007 | Hardjono et al. |
| 2007/0192484 | A1 | 8/2007 | Yamaoka |
| 2008/0101239 | A1 | 5/2008 | Goode |
| 2008/0170493 | A1 | 7/2008 | Vasseur |
| 2008/0225708 | A1 | 9/2008 | Lange |
| 2009/0086977 | A1 | 4/2009 | Berggren |
| 2009/0300707 | A1 | 12/2009 | Garimella et al. |
| 2012/0265984 | A1 | 10/2012 | Ramanujan |
| 2013/0239169 | A1 | 9/2013 | Nakhjiri |
| 2013/0345530 | A1 | 12/2013 | McRoberts et al. |
| 2014/0029418 | A1 | 1/2014 | Jain et al. |
| 2014/0115325 | A1 | 4/2014 | Detienne et al. |
| 2015/0089568 | A1 | 3/2015 | Sprague et al. |
| 2015/0128223 | A1 | 5/2015 | Magri et al. |
| 2015/0249591 | A1* | 9/2015 | Alvarez ................ H04L 45/124 370/252 |
| 2015/0341428 | A1 | 11/2015 | Chauhan |
| 2015/0372901 | A1 | 12/2015 | Pacella |
| 2016/0072708 | A1 | 3/2016 | Field |
| 2016/0080502 | A1 | 3/2016 | Yadav et al. |
| 2016/0119821 | A1 | 4/2016 | Ramachandran et al. |
| 2016/0315819 | A1* | 10/2016 | Dara ................... H04L 41/0246 |
| 2016/0323184 | A1 | 11/2016 | Li et al. |
| 2017/0026417 | A1* | 1/2017 | Ermagan ............. H04L 63/0428 |
| 2017/0302459 | A1 | 10/2017 | Fenner et al. |
| 2017/0353430 | A1 | 12/2017 | Holtmanns et al. |
| 2018/0041420 | A1* | 2/2018 | Saad ........................ H04L 45/12 |
| 2018/0109450 | A1 | 4/2018 | Filsfils et al. |
| 2018/0324090 | A1 | 11/2018 | Duncan et al. |
| 2018/0367321 | A1 | 12/2018 | Stammers et al. |
| 2018/0367449 | A1 | 12/2018 | Pani et al. |
| 2019/0041829 | A1 | 2/2019 | Sinha et al. |
| 2019/0052705 | A1* | 2/2019 | Giffin .................... H04W 4/021 |
| 2019/0058709 | A1 | 2/2019 | Kempf et al. |
| 2019/0098676 | A1 | 3/2019 | Svennebring |
| 2019/0116038 | A1 | 4/2019 | Sprague |
| 2019/0123999 | A1 | 4/2019 | Chunduri et al. |
| 2019/0140850 | A1 | 5/2019 | Ambrosin et al. |
| 2019/0173750 | A1 | 6/2019 | Shaikh et al. |
| 2020/0084132 | A1 | 3/2020 | Chauhan |
| 2020/0084202 | A1 | 3/2020 | Smith et al. |
| 2020/0153627 | A1 | 5/2020 | Wentz |
| 2020/0160320 | A1 | 5/2020 | Williams et al. |
| 2020/0287888 | A1* | 9/2020 | Moore ................ H04L 63/0892 |
| 2020/0296025 | A1* | 9/2020 | Wang ................. H04L 12/4633 |
| 2020/0322312 | A1 | 10/2020 | Psenak et al. |
| 2021/0083973 | A1* | 3/2021 | Peng ....................... H04L 45/02 |
| 2021/0160056 | A1 | 5/2021 | Yan |
| 2021/0297406 | A1 | 9/2021 | Landers et al. |
| 2021/0377173 | A1* | 12/2021 | Zhang .................... H04L 45/04 |

FOREIGN PATENT DOCUMENTS

| | | |
|---|---|---|
| CN | 105591811 B | 8/2019 |
| CN | 110650075 A | 1/2020 |
| DE | 60109809 T2 | 3/2006 |
| EP | 1732268 A1 | 12/2006 |
| EP | 2698961 B1 | 12/2014 |
| JP | 2004228817 A | 8/2004 |
| JP | 2004260567 A | 9/2004 |
| JP | 2015173378 A | 10/2015 |
| WO | 2011103781 A2 | 9/2011 |
| WO | 2012028409 A1 | 3/2012 |

OTHER PUBLICATIONS

Adnan A., et al., "A Trust Aware Routing Protocol For Energy Constrained Wireless Sensor Network," Telecommunication Systems, Baltzer Science Publishers, Basel, Ch, Jun. 10, 2015, vol. 61, No. 1, pp. 123-140, DOI: 10.1007/s11235-015-0068-8, ISSN 1018-4864, XP035595336.

Andersson L., et al., "LDF Specification," Network Working Group, Oct. 2007, 135 Pages.

Apnic: "Sdn Workshop", WSDN01_v0.1., Downloaded Sep. 26, 2019, 93 Pages, Retrieved from URL: https://wiki.apnictraining.net/_media/apnic46-sdn/wsdn01_-_module_4_-_bgp-Is_-_v1.0.pdf.

Awduche D.O., et al., "RSVP-TE: Extensions to RSVP for LSP Tunnels," Network Working Group, Request for Comments 3209, Dec. 2001, pp. 1-61.

Baker F., et al., "RSVP Cryptographic Authentication," RFC 2747, Jan. 2000, 21 Pages.

Bashandy A., et al., "Segment Routing with the MPLS Data Plane," RFC 8660, Dec. 6, 2019, The Internet Society, Reston, VA, USA, 29 pages.

Berger L., et al., "RSVP Extensions for IPSEC Data Flows," RFC2207, Sep. 1997, 14 Pages.

"Border Gateway Protocol Link-State," Downloaded Sep. 26, 2019, 12 Pages, Retrieved from URL: https://www.cisco.com/c/en/ld/doc/ios-XML/ios/iproute_bgp/configuration/xe-16/irg-xe-16-book/bgp-Is.pdf.

Braden R., et al., "Resource Reservation Protocol (RSVP)—Version 1 Functional Specification," RFC 2205, The Internet Society, Reston, VA, USA, Sep. 1997, pp. 1-112.

Butler K., et al., "A Survey of BGP Security Issues and Solutions," Proceedings of the IEEE Transactions on Networking, Jan. 2010, vol. 98, No. 1, 4 Pages.

Camtepe S.A., et al., "Kerberos Based Security System for Session Initiation Protocol," 1996, 150 Pages.

Clad F., Ed., et al., "Service Programming with Segment Routing, draft-ietf-spring-sr-service-programming-01," Nov. 4, 2019, 32 Pages.

Clad F., et al., "Service Programming with Segment Routing, draft-xuclad-spring-sr-service-programming-00," Jul. 2, 2018, 30 Pages.

Deering S., et al., "Internet Protocol, Version 6 (IPv6) Specification," RFC 8200, Jul. 2017, The Internet Society, Reston, VA, USA, 42 pages.

(56) References Cited

OTHER PUBLICATIONS

Durand J., et al., "BGP Operations and Security, rfc7454.txt," Internet Engineering Task Force (IETF), Standard, Internet Society (ISOC) 4, Rue Des Falaises CH-1205 Geneva, Switzerland, Feb. 18, 2015, pp. 1-26, XP015104552.
Farinacci D., et al., LISP Canonical Address Format (LCAF), Feb. 2017, 36 Pages, Retrieved from URL: https://tools.ietf.org/html/rfc8060.
Farinacci D., et al., "LISP Data-Plane Confidentiality," draft-ietf-lisp-crypto-10, Oct. 14, 2016, 21 Pages, Retrieved from URL: https://tools.ietf.org/html/draft-ietf-lisp-crypto-10.
Fuchs A., et al., "Time-Based Uni-Directional Attestation: draft-birkholz-rats-tuda-00," Network Working Group, Mar. 12, 2019, pp. 1-68.
Fuller V., et al., "Locator/ID Seperation Protocol (LISP) Control-Plane," draft-ietf-lisp-rfc6833bis-24, Feb. 4, 2019, 62 Pages, Retrieved from URL: https://tools.ietf.org/html/draft-ietf-lisp-rfc6833bis-24.
Gao B., "Implementation and Validation of the General Internet Signaling Transport Protocol," Apr. 2008, 117 Pages.
Gredler H., Ed., et al., "North-Bound Distribution of Link-State and Traffic Engineering (TE) Information Using BGP," Internet Engineering Task Force (IETF), Mar. 2016, 49 Pages, [Retrieved on Sep. 26, 2019], Retrieved from URL: https://tools.ietf.org/html/rfc7752.
Ham M.J., "BGP Route Attestation: Design and Obsrvation Using IPV6," Dakota State University, Beadle Scholar, Masters Theses & Doctoral Dissertations, Spring, Mar. 1, 2017, 161 Pages.
International Preliminary Report on Patentability for International Application No. PCT/US2020/026358, mailed Oct. 14, 2021, 08 Pages.
International Preliminary Report on Patentability for International Application No. PCT/US2020/026375, mailed Oct. 14, 2021, 08 Pages.
International Preliminary Report on Patentability for International Application No. PCT/US2020/026385, mailed Oct. 14, 2021, 14 Pages.
International Preliminary Report on Patentability for International Application No. PCT/US2020/026499, mailed Oct. 14, 2021, 08 Pages.
International Preliminary Report on Patentability for International Application No. PCT/US2020/026507, mailed Oct. 14, 2021, 09 Pages.
International Search Report and Written Opinion for International Application No. PCT/US2020/026358, mailed Jul. 21, 2020, 08 Pages.
International Search Report and Written Opinion for International Application No. PCT/US2020/026375, mailed Jul. 23, 2020, 09 Pages.
International Search Report and Written Opinion for International Application No. PCT/US2020/026499, mailed Jul. 21, 2020, 13 Pages.
International Search Report and Written Opinion for International Application No. PCT/US2020/026507, mailed Jul. 21, 2020, 11 Pages.
IP Routing: BGP Configuration Guide, Updated on Feb. 13, 2017, 13 Pages, [Retrieved on Sep. 26, 2019], Retrieved from URL: https://www.cisco.com/c/en/us/td/docs/ios-xml/ios/iproute_bgp/configuration/xe-16/irg-xe-16- book/irg-xe-16-book_chapter_01010101 .html, 2019.
Katz D., et al., "Bidirectional Forwarding Detection (BFD)", Internet Engineering Task Force (IETF), Jun. 2010, pp. 1-49.
Kent S., et al., "Threat Model for BGP Path Security," Internet Engineering Task Force (IETF), RFC: 7132, Standard, Internet Society (ISOC) 4, Rue Des Falaises CH-1205 Geneva, Switzerland, Feb. 22, 2014, pp. 1-20, XP015100576.
Kent S.T., "Securing the Border Gateway Protocol," The Internet Protocol Journal, Sep. 2003, 44 Pages.
Kim P., "Resource Reservation in Shared and Switched Demand Priority Local Area Networks," Sep. 1998, 24 pages.
Lepinski M., et al., "An Infrastructure to Support Secure Internet Routing, draft-ietf-sidr-arch-11.txt," Internet Engineering Task Force(IETF), Standard Working Draft, Internet Society (ISOC) 4, Rue Des Falaises CH-1205 Geneva, Switzerland, Sep. 21, 2010, No. 11, pp. 1-25, XP015071244.
Li Q., et al., "Enhancing the Trust of Internet Routing with Light-weight Route Attestation," IEEE Transactions on Information Forensics and Security, Piscataway, NJ, US, Apr. 1, 2012, vol. 7, No. 2, pp. 691-703, DOI: 10.1109/TIFS.2011.2177822, ISSN 1556-6013, XP011433682.
Maino F., et al., LISP-Security (LISP-SEC), draft-ietf-lisp-sec-17, Nov. 9, 2019, 23 Pages, Retrieved from URL: https://tools.ietf.org/html/draft-ietf-lisp-sec-17.
Mankin A., Ed., et al., "Resource Reservation Protocol (RSVP)—Version 1 Applicability Statement Some Guidelines on Deployment," RFC 2208, Sep. 1997, 19 Pages.
Partial Search Report for International Application No. PCT/US2020/02635, mailed Jul. 16, 2020, 15 Pages.
Patent Cooperation Treaty, International Search Report and Written Opinion for International Application No. PCT/US2020/026385, mailed Sep. 7, 2020, 22 Pages.
Rosen E., etal, "MPLS Label Stack Encoding," Network Working Group, RFC 3032, Jan. 2001, pp. 1-23.
Sagara K., et al., "A Distributed Authentication Platform Architecture For Peer-to-peer Applications," IEICE Transactions on Communications, Communications Society, Tokyo, JP, Mar. 1, 2005, vol. E88-B, No. 3, pp. 865-872, DOI:10.1093/ietcom/e88-b.3.865, ISSN 0916-8516, XP001225562.
Shoneman D.T, et al., "Endpoint Trust-based Traffic Management," IP.Com, IP.Com Incorporated, Oct. 31, 2017, 13 Pages, West Henrietta, NY, US, ISSN 1533-0001, XP013176242.
Singh D., "Yet Another New BGP NLR1: BGP-LS," Downloaded on Sep. 26, 2019, 20 Pages, Retrieved from URL: https://packetpushers.net/yet-another-new-bgp-nlri-bgp-ls/, Packet Pushers, 2015.
TCG Public Review: "TCG Guidance for Securing Network Equipment Using TCG Technology," Version 1.0, Revision 29, Jan. 17, 2018, 58 pages.
Trusted Computing Group: "TCG Guidance for Securing Network Equipment," Jan. 17, 2018, 2 Pages, Retrieved from URL: https://trustedcomputinggroup.org/resource/tcg-guidance-securing-network-equipment/.
Wang B., et al., "A light-weight trust-based QoS Routing Algorithm for Ad Hoc Networks," Pervasive and Mobile Computing, NL, Jun. 26, 2013, vol. 13, pp. 164-180, DOI: 10.1016/j.pmcj.2013.06.004, ISSN 1574-1192, XP055712411.
Wei Y., et al., "Analysis of Resource Reservation Protocol-Traffic Engineering (RSVP-TE) Security According to KARP Design Guide," draft-wei-karp-rsvp-te-analysis-00.txt, ZTE Corporation, Southeast University, Internet Engineering Task Force (IEFT), Standard Working Draft, Internet Society (ISOC) 4, Rue Des F, Jul. 27, 2011, pp. 1-8, XP015077504.

\* cited by examiner

SYSTEMS AND METHODS FOR STEERING TRAFFIC INTO SR-TE POLICIES

PRIORITY

This application is a continuation, under 35 U.S.C. § 120, of U.S. patent application Ser. No. 16/717,717 filed on Dec. 17, 2019, which claims priority to U.S. Provisional Patent Application No. 62/829,560 filed Apr. 4, 2019, U.S. Provisional Patent Application No. 62/829,592 filed Apr. 4, 2019, and U.S. Provisional Patent Application No. 62/829,575 filed Apr. 4, 2019, each of which is hereby incorporated by reference in its entirety.

TECHNICAL FIELD

This disclosure generally relates to steering traffic, and more specifically to systems and methods for steering traffic into segment routing for traffic engineering (SR-TE) policies.

BACKGROUND

Sensitive information may be transmitted through one or more nodes within a network. Certain nodes within the network may become compromised. For example, an attacker may gain access to one or more of the network nodes. If a network node is compromised, traditional protections such as link encryption may prove ineffectual in protecting the sensitive information traversing the compromised node.

DESCRIPTION OF EXAMPLE EMBODIMENTS

Overview

According to an embodiment, a system includes one or more processors and one or more computer-readable non-transitory storage media coupled to the one or more processors. The one or more computer-readable non-transitory storage media include instructions that, when executed by the one or more processors, cause one or more routers to perform operations including receiving network traffic. The operations also include determining that the network traffic matches a service route. The operations further include steering the network traffic into an SR-TE policy. The SR-TE policy is associated with the service route and includes a security level constraint.

In certain embodiments, the service route is associated with a color and the SR-TE policy is associated with the same color. The color may be a numerical value that differentiates multiple SR-TE policies between the same pair of network nodes of a network. The color may indicate one or more requirements for steering the network traffic through the network. The one or more requirements include a minimum security level. The service route may be associated with at least one of the following: Border Gateway Protocol (BGP) and Locator/Identifier Separation Protocol (LISP).

In some embodiments, the SR-TE policy may be one of the following: a local SR-TE per-destination policy or a local SR-TE per-flow policy. In certain embodiments, the SR-TE policy includes a dynamic candidate path. The dynamic candidate path may be computed using segment IDs (SIDs) having a security level equal to or greater than the security level constraint. In some embodiments, the SR-TE policy includes an explicit candidate path. The explicit candidate path may include a SID-list. The explicit candidate path may be invalidated if a security level of at least one SID within the SID list is less than the security level constraint. One or more candidate paths associated with the SR-TE policy may be computed by an SR-path computation element (SR-PCE). SR-PCE may compute the one or more candidate paths using one or more views received from a view-maker network element.

According to another embodiment, a method includes receiving, by a headend node, network traffic. The method also includes determining, by the headend node, that the network traffic matches a service route. The method further includes steering, by the headend node, the network traffic into an SR-TE policy. The SR-TE policy is associated with the service route and includes a security level constraint.

According to yet another embodiment, one or more computer-readable non-transitory storage media embody instructions that, when executed by a processor, cause the processor to perform operations including receiving network traffic. The operations also include determining that the network traffic matches a service route. The operations further include steering the network traffic into an SR-TE policy. The SR-TE policy is associated with the service route and includes a security level constraint.

Technical advantages of certain embodiments of this disclosure may include one or more of the following. Service routes may be steered into SR-TE policies with security level requirements, which may assist in routing traffic through trusted network nodes. The security level of each link and/or node of a network may be determined and leveraged for providing the SR-TE policies that meet specific security level requirements. The security level of each link and/or node of a network may be determined and leveraged to provide secure views of the network topology to headend and/or PCE nodes, which compute the SR-TE policies or Resource Reservation Protocol-Traffic Engineering (RSVP-TE) paths.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
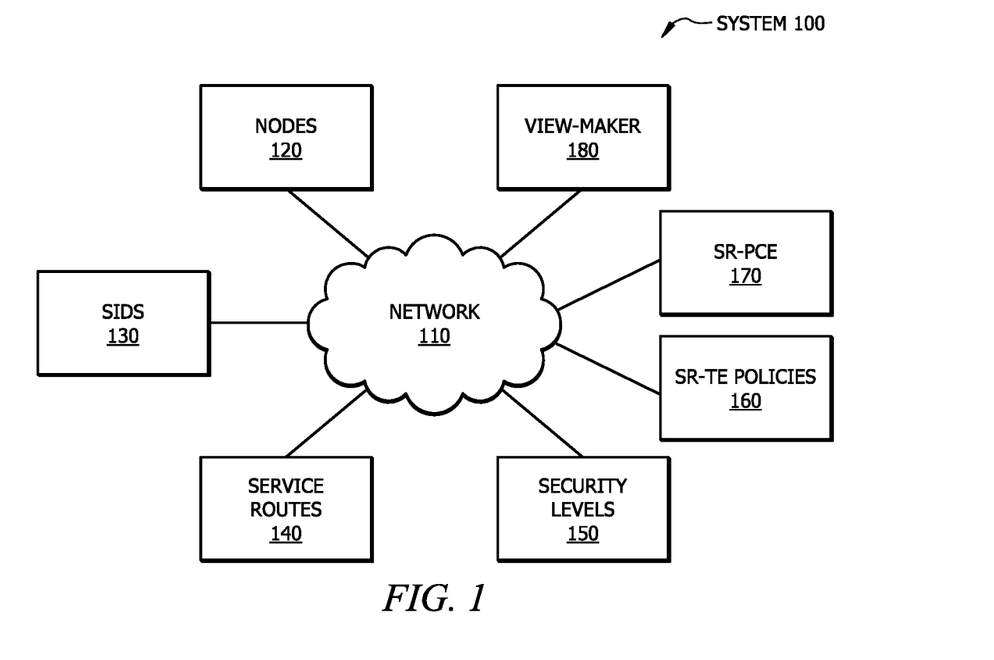
FIG. 1 illustrates an example system for steering network traffic into SR-TE policies.
Figure 2:
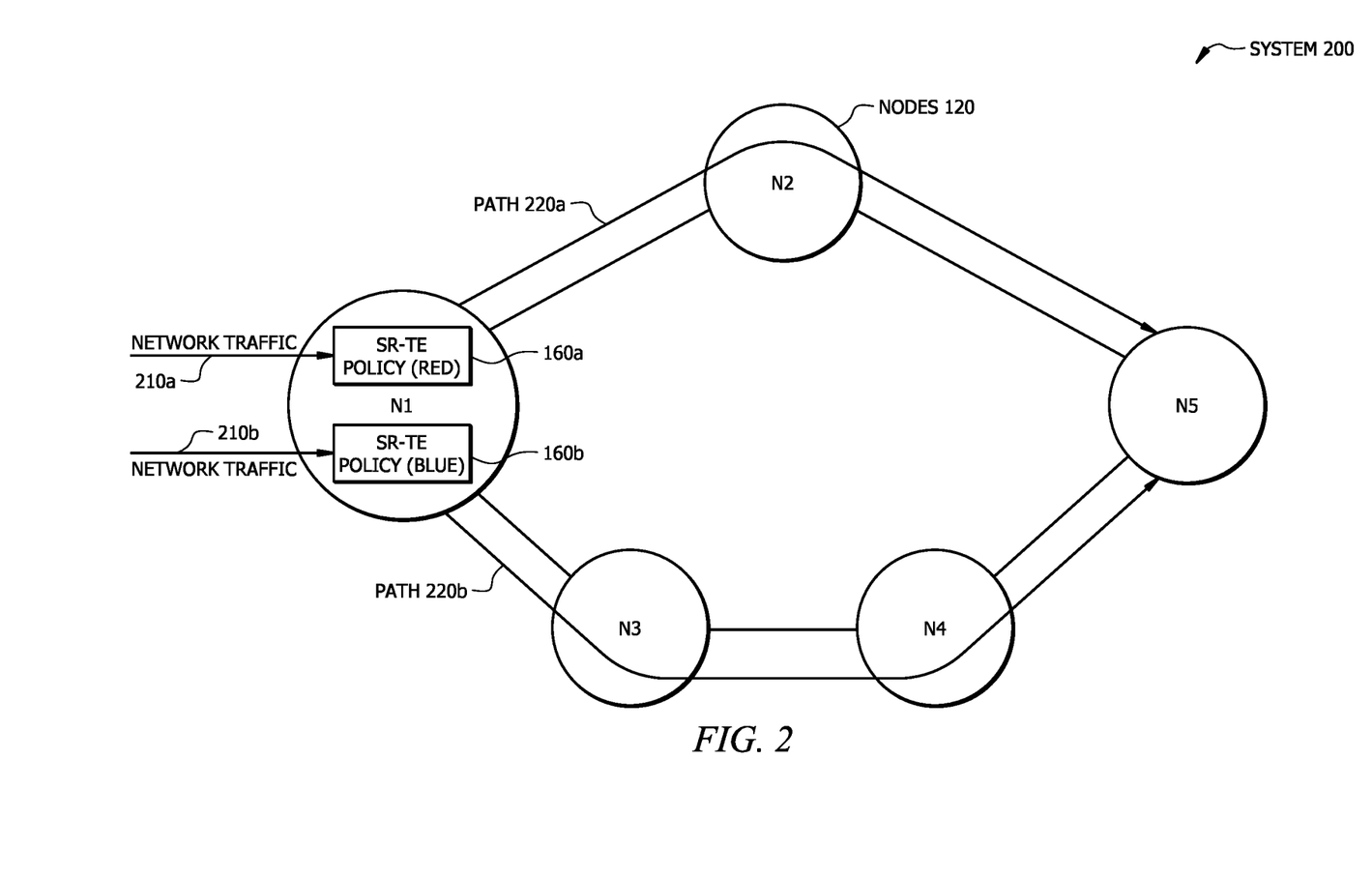
FIG. 2 illustrates another example system for steering network traffic into SR-TE policies.
Figure 3:
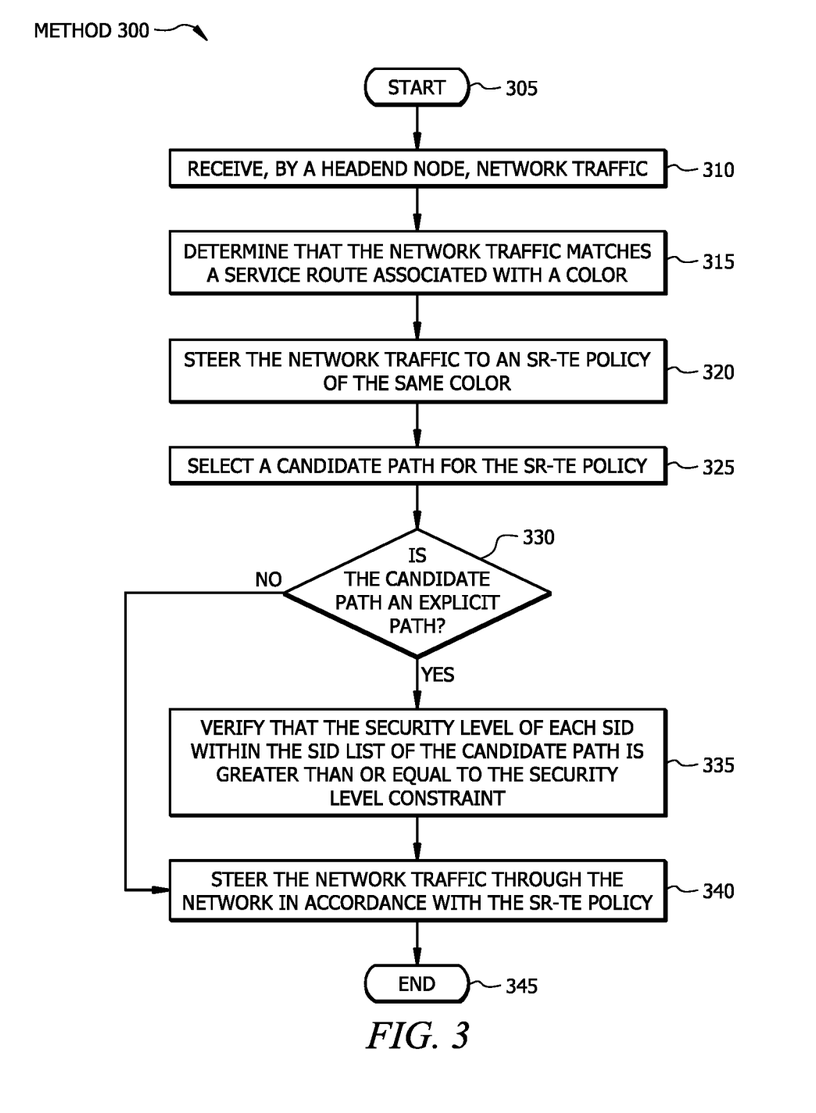
FIG. 3 illustrates an example method for steering network traffic into SR-TE policies.
Figure 4:
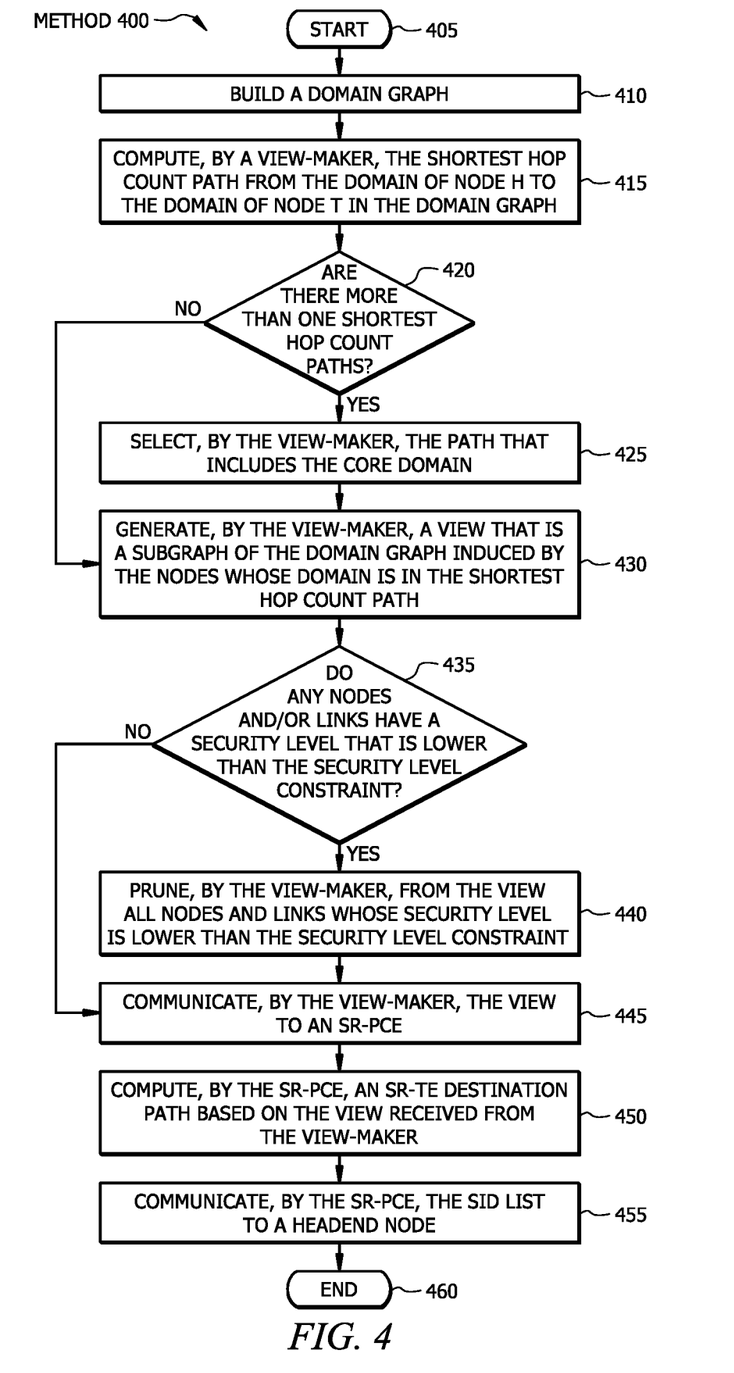
FIG. 4 illustrates an example method for generating SR-TE destination paths.
Figure 5:
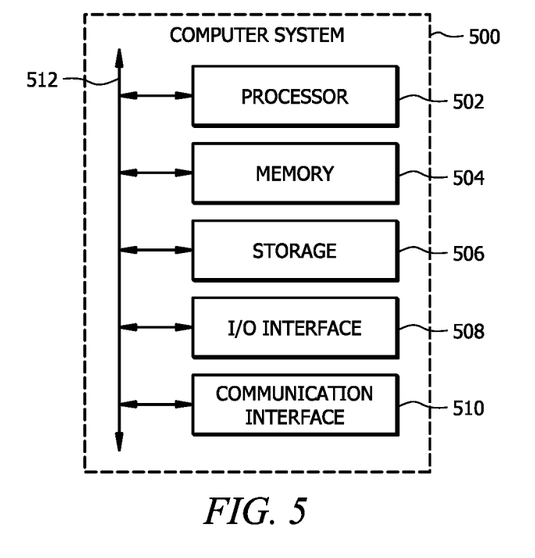
FIG. 5 illustrates an example computer system that may be used by the systems and methods described herein.

Embodiments of this disclosure include systems and methods for steering service routes into SR-TE policies with security level requirements. FIG. 1 shows an example system for steering network traffic into SR-TE policies, and FIG. 2 shows another example system for steering network traffic into SR-TE policies. FIG. 3 shows an example method for steering network traffic into SR-TE policies. FIG. 4 shows an example method for generating SR-TE destination paths. FIG. 5 shows an example computer system that may be used by the systems and methods described herein.

FIG. 1 illustrates an example system 100 for steering network traffic into SR-TE policies 160. System 100 or portions thereof may be associated with an entity, which may include any entity, such as a business or company (e.g., a service provider) that steers network traffic into SR-TE policies 160. The components of system 100 may include any suitable combination of hardware, firmware, and software. For example, the components of system 100 may use one or more elements of the computer system of FIG. 5.

System 100 includes a network 110, nodes 120, SIDs 130, service routes 140, security levels 150, SR-TE policies 160, an SR-PCE 170, and a view-maker 180. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In the illustrated embodiment of FIG. 1, network 110 is a segment routing network.

Nodes 120 of system 100 are connection points within network 110 that receive, create, store and/or send data along a path. Nodes 120 may include one or more redistribution points that recognize, process, and forward data to other nodes of network 110. Nodes 120 may include virtual and/or physical provider edge nodes. In certain embodiments, nodes 120 include data communications equipment such as switches, bridges, modems, hubs, and the like. In some embodiments, nodes 120 include data terminal equipment such as routers, servers, printers, workstations, and the like. Nodes 120 may be associated with different network domains. For example, a first subset of nodes 12 may be associated with a first network domain, a second subset of nodes 120 may be associated with a second network domain, and the like. Nodes 120 may include one or more headend nodes, tail-end nodes, destination nodes, provider edge nodes (e.g., ingress and egress provider edge nodes), customer edge nodes, etc.

SIDs 130 of system 100 represent segment identifiers of segments that are distributed throughout network 110. Segments are sub-paths that are combined to form a complete route to a network destination (e.g., destination node 120). Each node 120 and each link of network 110 may have an associated SID 130 that is used to direct network traffic along a specific path. SIDs 130 may include prefix SIDs 130, adjacency SIDs 130, and/or binding SIDs 130. Each prefix SID 130 includes an IP address prefix calculated by an Interior Gateway Protocol (IGP) in a network (e.g., a service provider core network.) Prefix SIDs 130 are globally unique within a network domain. Each adjacency SID 130 includes an advertising node's adjacency to a neighbor. Adjacency SID 130 is a link between two nodes 120. Adjacency SIDs 130 are locally unique (i.e., relative to a specific node 120).

Each binding SID 130 is a local label that is automatically allocated for each SR-TE policy 160 when SR-TE policy 160 is instantiated.

Service routes 140 of system 100 are paths that network traffic (e.g., data packets) traverse in network 110. Service routes 140 include every network component (e.g., routers, switches, etc.) that handles the network traffic between its source to its destination. Service routes 140 may be associated with one or more protocols (e.g., BGP, LISP, etc.). For example, BGP may automatically steer network traffic into SR Policy 160. In certain embodiments, each service route 140 is associated with a color (e.g., red, blue, green, yellow, and the like.) The color indicates one or more requirements for steering the network traffic through the network. The one or more requirements may include at least one of the following: a minimum security level, a minimum bandwidth capacity, the exclusion of one or more links between network nodes, and a maximum latency. For example, the color red may represent a minimum security level requirement and a minimum bandwidth capacity requirement for network traffic traversing a network path, and the color blue may represent a minimum security level requirement and a maximum latency requirement for network traffic traversing a network path. As another example, the color yellow may represent a path optimized for low latency and excluding links between particular nodes 120 of network 110, and the color green may represent a path optimized according to a default link metric (e.g., an IGP metric) with a maximum end-to-end latency (e.g., 15 milliseconds (ms)). In certain embodiments, BGP may automatically steer network traffic into SR Policy 160 based on BGP nexthop and/or the color of service route 140. The color of service route 140 may be set at node 120 (e.g., an egress provider edge node) by adding a color extended community to service route 140.

Security levels 150 of system 100 represent levels of trustworthiness for network elements. Each security level 150 may be represented by a numerical value. For example, each security level 150 may be represented by a number ranging from 1 to 10, where 1 represents the lowest (i.e., least secured) security level and 10 represents the highest (i.e., most secured) security level. In certain embodiments, security level 150 may be binary (e.g., trusted or not trusted.)

Security levels 150 of system 100 may be assigned to one or more SIDs 130. For example, security level 150 of each SID 130 may equal the lowest security level among all the network components traversed by that particular SID 130. Security level 150 of each SID 130 may be locally determined by each node 120 of network 110 based on the information that corresponding node 120 receives from its routing protocol(s) (e.g., Intermediate System-to-Intermediate System (ISIS), Open Shortest Path First (OSPF), BGP, etc.). For each adjacency SID 130 associated with a set of links to remote node 120, security level 150 equals the minimum security level 150 of the links and remote node 120. For each prefix SID 130, security level 150 is determined, on a per source basis, as the minimum security level 150 of each link and node 120 traversed by the shortest path from the source to the destination prefix (including the destination node itself) For each binding SID 130 bound to SR-TE Policy 160 or to an RSVP-TE tunnel, security level 150 is equal to the minimum security level 150 of headend node 120 and SR-TE Policy 160 (or the RSVP-TE tunnel) as advertised in the routing protocol. A segment whose security level 150 cannot be determined is assumed untrusted and may be assigned the lowest security level available (e.g., a security level value of one).

Security levels 150 of system 100 may be assigned to one or more SR-TE policies 160. SR-TE policies 160 use one or more candidate paths to route network traffic through network 110. Each candidate path includes a SID list. A SID list is a sequence of SIDs 130 that create a path for the network traffic to traverse. Security level 150 of SR-TE policy 160 is equal to security level 150 of its active (e.g., selected) candidate path. Security level 150 of SR-TE policy 160 is advertised in the routing protocol (e.g., BGP Link-State (BGP-LS)) together with binding SID 130 of SR-TE policy 160. The active candidate path of SR-TE policy 160 may be a dynamic candidate path or an explicit candidate path. A dynamic candidate path is based on an optimization objective and a set of constraints such that when the topology of network 110 changes, a new path (e.g., a SID list or a set of SID lists) is computed. An explicit candidate path is a specified SID list or a set of SID lists that is statically configured.

Security level 150 of a dynamic candidate path is equal to the lowest security level 150 among its constituent SIDs 130. If the dynamic candidate path is associated with several SID lists, SIDs 130 of all the SID lists are considered. Security level 150 of the dynamic candidate path may be determined by node 120 (e.g., a headend node or a controller) that computes and/or maintains the dynamic candidate path. Node 120 may signal security level 150 with the dynamic candidate path in the control plane protocol (e.g., Stateful Path Computation Element Protocol (PCEP)).

Security level 150 of an explicit candidate path may be determined by node 120 (e.g., a headend node or a controller) that computes and/or maintains the explicit candidate path. Node 120 may signal security level 150 with the explicit candidate path in the control plane protocol (e.g., PCEP or Network Configuration Protocol (NETCONF)). An explicit candidate path whose security level 150 cannot be determined is assumed compromised.

A security level constraint may be defined for candidate paths of SR-TE policies 160. When a security level constraint is defined for a dynamic candidate path, node 120 (e.g., a headend node or a controller) prunes from network 110 (e.g., the SR-TE topology) all SIDs 130 whose security level 150 is lower than the value of the security level constraint and computes a candidate path using only the remaining SIDs 130. Prefix SID 130 may only be used as part of the path if its security level 150 is equal to or greater than the value of the security level constraint. When a security level constraint is defined for an explicit candidate path, node 120 (e.g., a headend node) checks that security level 150 of all constituent SIDs 130 of the explicit candidate path SID-list(s) is equal to or greater than the value of the security level constraint. If security level 150 of at least one constituent SID 130 is below the value of the security level constraint or cannot be determined, then the explicit candidate path is invalidated.

SR-TE policies 160 of system 100 are policies used to steer traffic through network 110. Each SR-TE policy 160 is associated with a binding SID 130. Binding SID 130 is used to steer traffic into SR-TE policy 160. Each SR-TE policy 160 may be one of the following: a local SR-TE per-destination policy or a local SR-TE per-flow policy. A local SR-TE per-destination policy is defined on a headend (source) router with a color, a tail-end router, and one or more candidate paths, where each candidate path is either explicit (configured directly as a (set of) SID-list(s)) or dynamic (configured as an optimization objective and set of constraints). A local SR-TE per-flow policy is defined on a headend router with a color, a tail-end router, and an array of per-destination policies, all of them ending at the same tail-end and each associated with a Forward-Class attribute (an integer value). For example, a per-flow policy may be configured with Forward-class 0 associated with per-destination policy P1. As another example, a per-flow policy may be configured with Forward-class 1 associated with per-destination policy P2.

Independently from the per-flow policy configuration, the router is also configured to classify the packets it receives and mark them with a Forward-Class value. The Forward-Class marking is an attribute passed along with the packet during its processing on the router, but not carried within the packet. As such, the marking is lost when the packet leaves the router. For example, a router may be configured to detect and mark "voice" traffic with Forward-Class 1, while the rest of the traffic is marked with the default Forward-Class 0. As a result, voice traffic steered into a per-flow policy may be sent over the path defined in per-destination policy P1 (e.g., low latency), while non-voice traffic steered into the same per-flow policy may be sent over the path defined in per-destination policy P2 (e.g., high capacity).

In certain embodiments, SR-TE policy 160 includes a dynamic candidate path. The dynamic candidate path may be computed using SIDs 130 having security level 150 equal to or greater than the security level constraint. In some embodiments, SR-TE policy 160 includes an explicit candidate path. The explicit candidate path may include a SID-list. The explicit candidate path may be invalidated if security level 150 of at least one SID 130 within the SID list is less than the security level constraint.

In certain embodiments, one or more SR-TE policies 160 may be associated with a color (e.g., red, blue, green, yellow, etc.). The color may be a numerical value that differentiates multiple SR-TE policies 160 between the same pair of network nodes 120 of network 110. The color may indicate one or more requirements for steering the network traffic through network 110. The one or more requirements may include at least one of the following: a minimum security level, a minimum bandwidth capacity, and a maximum latency. One or more candidate paths associated with SR-TE policy 160 may be computed by SR-PCE 170.

SR-PCE 170 is a network component, an application, or node 120 that determines routes for conveying data between a source and a destination of network 110. SR-PCE 170 may provide centralized path calculation services to nodes 120 (e.g., headend nodes.) For example, headend node 120 may use path calculation services of SR-PCE 170 when headend node 120 does not have sufficient visibility over network 110 to compute a path (e.g., an inter-domain path) requested by a network operator. As another example, destination node 120 may use path calculations services of SR-PCE 170 when the coordination of several headend nodes 120 is necessary (e.g., when there are disjoint paths from distinct headend nodes 120). In a multi-domain environment, SR-PCE 170 needs full visibility over the entire multi-domain network 110 to compute optimal end-to-end SR-TE paths from any requesting node 120 to any endpoint. This complete topological information may be obtained by tapping into a BGP-LS feed (possibly via a route-reflector). Horizontal scalability may be achieved by distributing the SR-TE path calculation requests from multiple headend nodes 120 among several SR-PCEs 170.

In certain embodiments, one or two SR-PCEs 170 (second for redundancy) are assigned in each domain to handle the path calculation requests coming from headend nodes 120 in that domain. SR-PCE functionality may be enabled on any Internetworking Operating System (IOS) node 120. All of these SR-PCEs 170 have complete visibility over multi-domain network 110 and can thus compute optimal end-to-end paths to any endpoint. In certain embodiments, the network topology provided as input to the path calculation algorithm may be too large for SR-PCE 170 to respond to the path calculation requests and provide the necessary path updates in a timely manner.

View-maker 180 of system 100 is a network component (e.g., a network controller) that is used to reduce the size of the network topology provided as input for path calculations. View-maker 180 decouples the network topology collection from the path calculation to provide a more relevant, significantly smaller input topology to SR-PCE 170. Since most of the network traffic is intra-domain and only limited inter-domain traffic engineering is required, each SR-PCE 170 may not need to know the topology of all other domains in network 110. In certain embodiments, view-maker 180 manages the multi-domain network topology on behalf of SR-PCEs 170. Through BGP-LS, view-maker 180 obtains the complete multi-domain network topology and maintains it in a local database. Each SR-PCE 170 learns the topology of its local domain via IGP. This local domain knowledge allows SR-PCE 170 to autonomously serve all intra-domain path calculation requests that it receives from headend nodes 120. Upon receiving an inter-domain path calculation request (possibly with a security level constraint), SR-PCE 170 issues a view request to view-maker 180.

In certain embodiments, SR-PCE 170 communicates a view request to view-maker 180 to obtain a path from headend node H and tail-end node T. View-maker 180 determines a relevant subset of the global topology required to compute an optimal end-to-end path from headend node H to tail-end node T. This subset of the global topology is called a view. To ensure that the inter-domain traffic does not transit via an access domain instead of the core, a C-flag may be introduced to mark the core domain(s) as such. This core domain marking may be performed by a network operator or dynamically derived by view-maker 180 using a heuristic.

View-maker 180 may determine the relevant subset of the global topology required to compute the optimal end-to-end path from headend node H to tail-end node T by building a domain graph G_D. Each node 120 represents a domain of the global topology and the links represent the inter-domain connectivity. View-maker 180 computes the shortest hop count path P_D from the domain of headend node H to the domain of tail-end node T in domain graph G_D. If there are more than one shortest paths, view-maker 180 prioritizes the path that transits via the core domain (e.g., the path marked with the C-flag). View-maker 180 creates a new view V that is the subgraph of G induced by nodes 120 whose domain is in P_D. View-maker 180 prunes from view V all nodes and links (if any) whose security level 150 is lower than the path requirement security level (e.g., the security level constraint.) View-maker 180 communicates the computed view V to SR-PCE 170.

SR-PCE 170 computes the request SR-TE path based on view V received from view-maker 180. SR-PCE 170 sends the resulting SID list to headend node 120. As such, the input topology may be significantly smaller than the complete multi-domain topology, which results in a significantly faster path calculation. Since SR-PCE 170 has a full view of the relevant network domains, the end-to-end path computed by SR-PCE 170 remains optimal. In certain embodiments, SR-PCE 170 may cache view V for future use. In some embodiments, view-maker 180 is a dedicated SR-PCE 170.

Resiliency may be achieved by having redundant SR-PCE view-makers 180 with an active inter-PCE state-synch session between them.

View-maker 180 allows the SR-PCE architecture to scale to massive networks 110 with potentially hundreds of domains and millions of endpoints. The network integrity (e.g., security status) verification may be delegated to a centralized entity such that each node 120 does not need to continuously check the integrity of every other node 120. View-maker 180 itself may not need to be fully trusted. For example, view-maker 180 may advertise its own security level 150 that headend node 120 or SR-PCE 170 verifies to assess security level 150 of view-maker 180.

In operation, headend node 120 uniquely identifies SR-TE policy 160 by the color red, which represents a minimum security level requirement. Headend node 120 calculates one or more candidate paths through network 110 that satisfy the minimum security level requirement using a view received from view-maker 180. Headend node 120 associates the one or more candidate paths with red SR-TE policy 160. Headend node 120 receives network traffic from one or more nodes 120 of network 110 (e.g., an egress provider edge node) and determines that the network traffic matches service route 140, which is associated with the color red. Headend node 120 steers the network traffic into red SR-TE policy 160. Headend node 120 selects a candidate path for SR-TE policy 160 and steers the network traffic through the selected candidate path using SR-TE policy 160. As such, system 100 may be used to steer network traffic into SR-TE policies 160 to provide a minimum level of security for the network traffic as it traverses network 110.

Although FIG. 1 illustrates a particular arrangement of network 110, nodes 120, SIDs 130, service routes 140, security levels 150, SR-TE policies 160, SR-PCE 170, and a view-maker 180, this disclosure contemplates any suitable arrangement of network 110, nodes 120, SIDs 130, service routes 140, security levels 150, SR-TE policies 160, SR-PCE 170, and a view-maker 180. For example, nodes 120 of system 100 may be associated with multiple domains. Although FIG. 1 illustrates a particular number of networks 110, nodes 120, SIDs 130, service routes 140, security levels 150, SR-TE policies 160, SR-PCEs 170, and view-makers 180, this disclosure contemplates any suitable number of networks 110, nodes 120, SIDs 130, service routes 140, security levels 150, SR-TE policies 160, SR-PCEs 170, and view-makers 180. For example, system 100 may include multiple SR-PCEs 170. Although FIG. 1 describes and illustrates particular components performing particular actions of system 100, this disclosure contemplates any suitable combination of any suitable components, devices, or systems carrying out any suitable actions of system 100. For example, a network controller may perform one or more of the calculations described in FIG. 1.

FIG. 2 illustrates another example system 200 for steering network traffic into SR-TE policies. FIG. 2 includes network traffic 210a, network traffic 210b, SR-TE policy 160a, SR-TE policy 160b, path 220a, path 220b, and the following nodes 120: node N1, node N2, node N3, node N4, and node N5. Node N1 represents a headend node and node N5 represents a tail-end node. SR-TE policy 160a is a red SR-TE policy. The color red represents a security level constraint of 8 and a minimum bandwidth capacity requirement of 10 megabits per second (MB/s). SR-TE policy 160b is a blue SR-TE policy. The color blue represents a security level constraint of 8 and a maximum latency requirement of 15 ms. Red SR-TE policy 160a and blue SR-TE policy 160b are configured on headend node N1.

Headend node N1 receives network traffic 210a and network traffic 210b. Network traffic 210a is associated with a red service route and network traffic 210b is associated with a blue service route. Headend node N1 steers network traffic 210a, which is associated with a red service route, into red SR-TE policy 160a based on the matching color. Red SR-TE policy 160a includes destination path 220a. Destination path 220a begins at headend node N1, traverses node N2, and ends at tail-end node N5. Headend node N1 steers network traffic 210a along path 220a to tail-end node N5 using red SR-TE policy 160a. Headend node N1 steers network traffic 210b, which is associated with a blue service route, into blue SR-TE policy 160b based on the matching color. Blue SR-TE policy 160b includes destination path 220b. Destination path 220b begins at headend node N1, traverses node N3, traverses node N4, and ends at tail-end node N5. Headend node N1 steers network traffic 210b along path 220b to tail-end node N5 using blue SR-TE policy 160b. As such, network traffic 210a arrives at tail-end node N5 in accordance with a security level constraint of 8 and a minimum bandwidth capacity requirement of 10 MB/s, and network traffic 210b arrives at tail-end node N5 in accordance with a security level constraint of 8 and a maximum latency requirement of 15 ms.

Although FIG. 2 illustrates a particular arrangement of nodes 120, SR-TE policy 160a, SR-TE policy 160b, network traffic 210a, network traffic 210a, path 220a, and path 220b, this disclosure contemplates any suitable arrangement of nodes 120, SR-TE policy 160a, SR-TE policy 160b, network traffic 210a, network traffic 210a, path 220a, and path 220b. Although FIG. 2 illustrates a particular number of nodes 120, SR-TE policies 160a, SR-TE policies 160b, network traffic 210a, network traffic 210a, paths 220a, and paths 220b, this disclosure contemplates any suitable number of nodes 120, SR-TE policies 160a, SR-TE policies 160b, network traffic 210a, network traffic 210a, paths 220a, and paths 220b. For example, nodes 120 of system 200 may include more than five nodes 120 (e.g., a thousand nodes.) Although FIG. 2 describes and illustrates particular components performing particular actions of system 200, this disclosure contemplates any suitable combination of any suitable components, devices, or systems carrying out any suitable actions of system 200.

FIG. 3 illustrates an example method 300 for steering network traffic into SR-TE policies. Method 300 begins at step 305. At step 310, a headend node (e.g., node 120 of FIG. 1) of a network (e.g., network 110 of FIG. 1) receives network traffic from another node (e.g., an egress provider edge node) of the network. Method 300 then moves from step 310 to step 315, where the headend node determines that the network traffic matches a service route (e.g., service route 140 of FIG. 1) associated with a color. For example, the headend node may determine that the service route is associated with the color red. The color red may represent one or more requirements for steering the network traffic through the network, such as a minimum security level requirement and a minimum bandwidth capacity requirement. Method 300 then moves from step 315 to step 320. At step 320, the headend node steers the network traffic into an SR-TE policy (e.g., SR-TE policy 160 of FIG. 1) associated with the same color. For example, the service route may be a red service route, and the headend node may steer the network traffic into a red SR-TE policy. Method 300 moves from steps 320 to step 325.

At step 325, the headend node selects a candidate path for the SR-TE policy. The candidate path may be a dynamic candidate path or an explicit candidate path. Method 300 then moves from step 325 to step 330, where the headend node determines whether the candidate path is an explicit candidate path. If the candidate path is an explicit candidate path, method 300 moves from step 330 to step 335, where the headend node verifies that the security level of each SID within the SID list of the explicit candidate path is greater than or equal to the security level constraint. Method 300 then moves from step 335 to step 340. If, at step 330, the candidate path is not an explicit candidate path (e.g., the candidate path is a dynamic candidate path), method 300 advances from step 330 to step 340. At step 340, the headend node steers the network traffic through the network in accordance with the SR-TE policy. Method 300 then moves from step 340 to step 345, where method 300 ends. As such, method 300 may be used to steer network traffic into SR-TE policies, which provides a level of trustworthiness for the network traffic as it traverses the network.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method 300 for steering network traffic into SR-TE policies including the particular steps of the method of FIG. 3, this disclosure contemplates any suitable method 300 for steering network traffic into SR-TE policies, including any suitable steps, which may include all, some, or none of the steps of the method of FIG. 3, where appropriate. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example method 400 for generating SR-TE destination paths. Method 400 begins at step 405. At step 410, a view-maker (e.g., view-maker 170 of FIG. 1) builds a domain graph. The view-maker may build the domain graph in response to receiving a destination path request from an SR-PCE. The destination path request may be a request for a trustworthy path (e.g., a path having a security level constraint of 8) from headend node H to tail-end node T of an SR network. Each node of the domain graph represents a domain of the global topology and the links represent the inter-domain connectivity. Method 400 then moves from step 410 to step 415, where the view-maker computes the shortest hop count path from the domain of headend node H to the domain of tail-end node T in the domain graph. Method 400 then moves from step 415 to step 420.

At step 420, the view-maker determines whether there are more than one shortest hop count paths. If there are more than one shortest hop count paths, method 400 moves from step 420 to step 425, where the view-maker selects the path that includes the core domain. In certain embodiments, the core domain may be marked with a C-flag. Method 400 then moves from step 425 to step 430. If, at step 420, there is only one shortest hop count path, method 400 advances from step 420 to step 430.

At step 430, the view-maker generates a view that is a subgraph of the domain graph induced by the nodes whose domain is in the shortest hop count path. Method 400 then moves from step 430 to step 435, where the view-maker determines whether any nodes and/or links in the view have a security level that is lower than the security level constraint. For example, the security level constraint may have a value of 8, and the view-maker may determine whether any nodes and/or links in the view have a security level less than 8. If the view-maker determines that any nodes and/or links in the view have a security level that is lower than the security level constraint, method 400 moves from step 435 to step 440, where the view-maker prunes from the view all nodes and links whose security level is lower than the security level constraint. For example, the view-maker may prune from the view all nodes and/or links having a security level of less than 8. Method 400 then moves from step 440 to step 445. If, at step 435, the view-maker determines that no nodes or links in the view have a security level that is lower than the security level constraint, method 400 advances from step 435 to step 445.

At step 445, the view-maker communicates the view to an SR-PCE (e.g., SR-PCE 170 of FIG. 1). The SR-PCE provides centralized path calculation services to a headend node. Method 400 then moves from step 445 to step 450, where the SR-PCE computes an SR-TE destination path based on the view received from the view-maker. Method 400 then moves from step 450 to step 455, where the SR-PCE communicates the SID list associated with the SR-TE destination path to the headend node. The headend node may then steer network traffic into the SR-TE destination path, which provides a level of trustworthiness for the network traffic as it traverses the network. Method 400 then moves from step 455 to step 460, where method 400 ends. As such, method 400 may be used to generate SR-TE destination paths using views obtained from a view-maker, which may significantly decrease the path calculation time.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method 400 for generating SR-TE destination paths including the particular steps of the method of FIG. 4, this disclosure contemplates any suitable method 400 for generating SR-TE destination paths, including any suitable steps, which may include all, some, or none of the steps of the method of FIG. 4, where appropriate. Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media coupled to the one or more processors and comprising instructions that, when executed by the one or more processors, cause one or more network nodes within a network to perform operations comprising:
receiving network traffic;
computing a dynamic candidate path using segment IDs (SIDs) each having a security level equal to or greater than a security level constraint, wherein:
the dynamic candidate path is associated with a segment routing for traffic engineering (SR-TE) policy;
the security level of a first SID of the SIDs is a value representing a level of trustworthiness of the first SID; and
the security level constraint is a value representing a level of trustworthiness;
determining that the network traffic matches a service route associated with the SR-TE policy;
selecting the dynamic candidate path for the SR-TE policy; and
steering the network traffic into the dynamic candidate path for the SR-TE policy.

2. The system of claim 1, wherein:
the service route and the SR-TE policy are associated with a color;
the color is a numerical value that differentiates multiple SR-TE policies between a pair of network nodes of the network; and
the color indicates one or more requirements for steering the network traffic through the network, wherein the one or more requirements comprise a minimum security level.

3. The system of claim 1, wherein:
the dynamic candidate path is associated with a plurality of SID lists; and
the security level of the dynamic candidate path is equal to a lowest security level of the SIDs within the plurality of SID lists.

4. The system of claim 3, the operations further comprising signaling the security level of the dynamic candidate path in a Stateful Path Computation Element Protocol (PCEP).

5. The system of claim 1, the operations further comprising:
defining the security level constraint for the dynamic candidate path;
pruning all of the SIDs within the network having the security level lower than the value of the security level constraint; and
computing the dynamic candidate path using only the remaining SIDs.

6. The system of claim 1, wherein the service route is associated with at least one of the following:
a Border Gateway Protocol (BGP); and
a Locator/Identifier Separation Protocol (LISP).

7. The system of claim 1, wherein:
one or more candidate paths associated with the SR-TE policy are computed by an SR-path computation element (SR-PCE); and
the SR-PCE computes the one or more candidate paths using one or more views received from a view-maker network element.

8. A method, comprising:
receiving network traffic;
computing a dynamic candidate path using segment IDs (SIDs) having a security level equal to or greater than a security level constraint, wherein:
the dynamic candidate path is associated with a segment routing for traffic engineering (SR-TE) policy;
the security level of a first SID of the SIDs is a value representing a level of trustworthiness of the first SID; and
the security level constraint is a value representing a level of trustworthiness;
determining that the network traffic matches a service route associated with the SR-TE policy;
selecting the dynamic candidate path for the SR-TE policy; and
steering the network traffic into the dynamic candidate path for the SR-TE policy.

9. The method of claim 8, wherein:
the service route and the SR-TE policy are associated with a color;
the color is a numerical value that differentiates multiple SR-TE policies between a pair of network nodes of a network; and
the color indicates one or more requirements for steering the network traffic through the network, wherein the one or more requirements comprise a minimum security level.

10. The method of claim 8, wherein:
the dynamic candidate path is associated with a plurality of SID lists; and
the security level of the dynamic candidate path is equal to a lowest security level of the SIDs within the plurality of SID lists.

11. The method of claim 10, further comprising signaling the security level of the dynamic candidate path in a Stateful Path Computation Element Protocol (PCEP).

12. The method of claim 8, further comprising:
defining the security level constraint for the dynamic candidate path;
pruning all of the SIDs having the security level lower than the value of the security level constraint; and
computing the dynamic candidate path using only the remaining SIDs.

13. The method of claim 8, wherein the service route is associated with at least one of the following:
a Border Gateway Protocol (BGP); and
a Locator/Identifier Separation Protocol (LISP).

14. The method of claim 8, wherein:
one or more candidate paths associated with the SR-TE policy are computed by an SR-path computation element (SR-PCE); and
the SR-PCE computes the one or more candidate paths using one or more views received from a view-maker network element.

15. One or more computer-readable non-transitory storage media embodying instructions that, when executed by a processor, cause the processor to perform operations comprising:
receiving network traffic;
computing a dynamic candidate path using segment IDs (SIDs) having a security level equal to or greater than a security level constraint, wherein:
the dynamic candidate path is associated with a segment routing for traffic engineering (SR-TE) policy;
the security level of a first SID of the SIDs is a value representing a level of trustworthiness of the first SID; and
the security level constraint is a value representing a level of trustworthiness;
determining that the network traffic matches a service route associated with the SR-TE policy;
selecting the dynamic candidate path for the SR-TE policy; and
steering the network traffic into the dynamic candidate path for the SR-TE policy.

16. The one or more computer-readable non-transitory storage media of claim 15, wherein:
the service route and the SR-TE policy are associated with a color;
the color is a numerical value that differentiates multiple SR-TE policies between a pair of network nodes of a network; and
the color indicates one or more requirements for steering the network traffic through the network, wherein the one or more requirements comprise a minimum security level.

17. The one or more computer-readable non-transitory storage media of claim 15, wherein:
the dynamic candidate path is associated with a plurality of SID lists; and
the security level of the dynamic candidate path is equal to a lowest security level of the SIDs within the plurality of SID lists.

18. The one or more computer-readable non-transitory storage media of claim 17, the operations further comprising signaling the security level of the dynamic candidate path in a Stateful Path Computation Element Protocol (PCEP).

19. The one or more computer-readable non-transitory storage media of claim 15, the operations further comprising:
defining the security level constraint for the dynamic candidate path;
pruning all of the SIDs having the security level lower than the value of the security level constraint; and
computing the dynamic candidate path using only the remaining SIDs.

20. The one or more computer-readable non-transitory storage media of claim 15, wherein the service route is associated with at least one of the following:
a Border Gateway Protocol (BGP); and
a Locator/Identifier Separation Protocol (LISP).

* * * * *